United States Patent Office 2,918,132
Patented Dec. 22, 1959

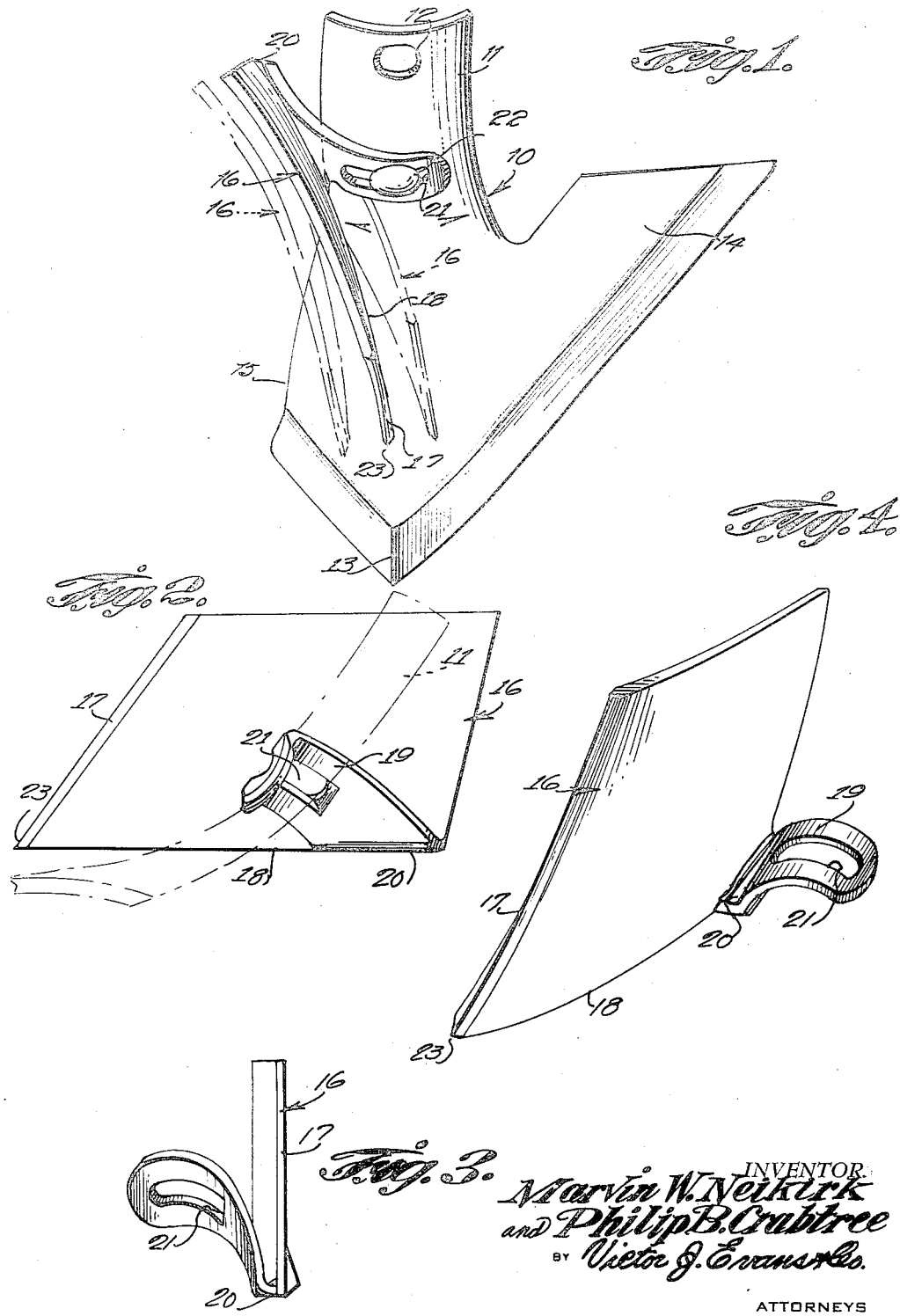

2,918,132

CULTIVATOR SWEEP

Marvin W. Neikirk and Philip B. Crabtree, Forest City, Ill.

Application July 3, 1957, Serial No. 669,765

2 Claims. (Cl. 172—736)

This invention relates to an agricultural implement, and more particularly to a cultivator sweep.

The object of the invention is to provide a cultivator sweep which has a deflector blade adjustably or releasably connected thereto.

Another object of the invention is to provide a cultivator sweep which is provided with a deflector blade that is releasably connected thereto so that the cultivator sweep can be used with or without the deflector blade, and wherein the deflector blade can be arranged in different angular positions as desired.

A further object of the invention is to provide a cultivator sweep and deflector blade which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view showing the cultivator sweep and deflector blade attached thereto.

Figure 2 is a side elevational view of the deflector blade.

Figure 3 is a rear elevational view of the deflector blade.

Figure 4 is a perspective view showing the deflector blade.

Referring in detail to the drawings, the numeral 10 indicates the cultivator sweep which is in the form of a shovel that embodies an upstanding shank 11 that has a curved or arcuate formation. The shank 11 is adapted to be connected to the lower end of a supporting member which may be arranged rearwardly of a tractor or other agricultural implement. The shank 11 is provided with a plurality of spaced apart openings 12, Figure 1. The front of the shovel is pointed as at 13, and the shovel or sweep includes at least one rearwardly extending side wing portion 14, while the other side of the shovel may be cut away as at 15.

The numeral 16 indicates a deflector blade which is adapted to be releasably or detachably connected to the shovel, and the blade 16 is of substantially rectangular formation and has a somewhat curved or bowed shape. The front edge of the blade 16 is inclined, as for example as shown in Figure 2, and this front edge is indicated by the numeral 17 and this edge is also sharpened. The numeral 18 designates the lower edge of the blade 16 which is straight, and the lower edge 18 of the blade 16 is adapted to rest on the upper surface of the shovel 10.

A means is provided for detachably connecting the deflector blade 16 to the shank 11, and this means comprises an arcuate or curved support member 19 which has one end secured as by welding as at 20 to a corner of the blade or plate 16. The support member 19 is provided with a slot 21 whereby a suitable securing element 22 can be extended through this slot 21 and through one of the openings 12.

From the foregoing, it is apparent that there has been provided an improved cultivator sweep which includes a deflector blade that is adjustably connected thereto. When desired, the blade 16 can be removed from the sweep or shovel 10 so that the sweep or shovel 10 can be used as a conventional shovel. In other words, by loosening the bolt and nut assembly 22 and then removing the bolt and nut assembly 22 from the slot 21 and opening 12, the blade 16 can be completely removed from the shovel. When the blade 16 is being used on the shovel, the bolt 22 extends through the slot 21 and through the registering opening 12 and due to the provision of the elongated slot 21, it will be seen that by loosening the bolt slightly, the blade 16 can be positioned in different positions, as for example the blade 16 can be moved from the solid line position shown in Figure 1 to the broken line positions shown in Figure 1 so that the blade 16 can be positioned at any desired point. The blade 16 includes the tapered flat edge 17 which terminates in the lower point 23 so that as the device is drawn through the ground, the soil will be properly worked and moved to the desired location. The support member 19 has an edge thereof secured as by welding to a corner of the blade 16, and since the support member 19 has a curved formation, it will conform to the configuration of the curved shank 11. Since the lower surface 18 of the blade 16 rests on the top of the shovel 10, it will be seen that a firm support is provided for the blade 16 when it is being used in conjunction with the shovel.

According to the present invention, the blade 16 serves as a deflector whereby dirt can be readily moved to any desired location as for example such dirt or soil can be moved onto growing crops, and wherein weeds can be destroyed by covering such weeds with dirt and wherein the depth of penetration can be varied as desired. The blade 16 is adjustable so that the exact amount of dirt can be moved as desired, and to adjust the blade 16 it is only necessary to loosen the bolt 22 and thus it is not necessary to loosen the shank on the cultivator since in many instances such shanks are not adjustable. A further advantage of the present invention is that the blade or attachment can be readily removed or replaced when desired so that the farmer or other person does not have to invest or purchase several different styles of sweeps. The blade 16 is fastened on top of the shovel so that it catches the full flow of dirt and actually turns the soil in the same manner as a moldboard and whereby a better scouring action is accomplished and wherein trash will not accumulate thereon. Furthermore, since the blade 16 is adjustable, the operator can control the flow of dirt by adjusting the blade back and forth over the top of the sweep. Thus, it is not necessary to turn the shank of the cultivator to make the sweep throw more dirt, and when the sweep is running straight with the row, it has a much better cutting action. The device can also be used as a jointer if desired, by mounting the attachment in the top hole of the sweep. By using the device to throw dirt onto crops, weeds will be covered so that such weeds can be effectively controlled. With the attachment on top of the sweep, the user can place a sufficient flow of dirt onto the crops in the row with shallow cultivation which is an important advantage.

While we have shown a preferred form of our invention, we reserve all rights to such modifications as properly fall within the scope of the invention as claimed.

We claim:

1. In combination, a cultivator sweep including an upstanding shank provided with a plurality of spaced apart openings therein, said shank being of curved formation, said sweep further including a front surface, a lower front pointed end and a rearwardly extending side wing portion, a blade of substantially rectangular formation positioned in overlying relation to said sweep with the lower edge of the blade resting on the upper surface of the sweep and with the front edge of said blade overlying the front surface of the sweep in a vertical spaced relation thereto, said blade having a slightly outwardly curved formation in relation to the front surface of said sweep, the front of said blade being inclined from the upper edge thereof forwardly toward the lower front pointed end of said sweep and being sharpened, and means for releasably connecting said blade to the front surface of said shank.

2. The combination as in claim 1, wherein the means for releasably connecting said blade to the front surface of said shank comprises a support member having one end secured to the rear of the blade, there being an elongated slot in said support member, and a securing element extending through said slot and through one of the openings in said shank, said support member having a curved shape to conform to the curvature of the shank.

References Cited in the file of this patent

UNITED STATES PATENTS

| | | |
|---|---|---|
| 159,174 | Gale | Jan. 26, 1875 |
| 243,570 | Jefferson | June 28, 1881 |
| 2,087,118 | Rooks | July 13, 1937 |
| 2,771,832 | Doskocil | Nov. 27, 1956 |